United States Patent [19]

Taylor

[11] 4,265,284
[45] May 5, 1981

[54] WORK BENCH

[75] Inventor: George O. Taylor, Guildford, England

[73] Assignee: Bondgrade Limited, Slough, England

[21] Appl. No.: 922,680

[22] Filed: Jul. 7, 1978

[30] Foreign Application Priority Data

Jul. 7, 1977 [GB] United Kingdom ............... 28642/77

[51] Int. Cl.³ ............................................... B27C 9/02
[52] U.S. Cl. ..................................... 144/287; 108/90; 108/144; 144/288 R; 269/303; 269/901
[58] Field of Search ......................... 269/321 CF, 303; 248/165, 172; 108/28, 65, 83, 90, 106, 144; 144/288 R, 288 A, 287, 1 R, 1 B, 1 C, 1 E, 286 R

[56] References Cited

U.S. PATENT DOCUMENTS

| | | | |
|---|---|---|---|
| 350,819 | 10/1886 | Enge | 144/286 R |
| 2,556,611 | 6/1951 | Bomgman | 108/65 |
| 2,799,306 | 7/1957 | Martin | 144/285 |
| 3,080,832 | 3/1963 | Schroemges | 108/65 |
| 3,269,439 | 8/1966 | Thomas | 144/286 R |
| 3,342,226 | 9/1967 | Marcoux et al. | 144/286 R |
| 3,406,728 | 10/1968 | Rosf | 144/286 R |
| 3,428,307 | 2/1969 | Hunter et al. | 108/83 X |
| 4,068,551 | 1/1978 | Kreitz | 144/288 R |
| 4,127,260 | 11/1978 | Hickman | 269/321 CF |
| 4,157,174 | 6/1979 | Hickman et al. | 269/321 CF |

Primary Examiner—W. D. Bray
Attorney, Agent, or Firm—Fleit & Jacobson

[57] ABSTRACT

A workbench comprises a rigid frame support having telescoped legs to provide adjustable working height and supporting a flat topped work surface. The frame has two widely spaced apart parallel guide rods extending from one side of the work surface, the guide rods having slideable thereon a clamping member to clamp a tool against the adjacent side of the work surface.

8 Claims, 12 Drawing Figures

WORK BENCH

The present invention relates to work benches.

Over the last several years a number of electrically operated portable machine tools have come onto the market including electric drills, routers, circular saws, sanders etc. These are usually handheld and the workpiece is clamped or supported in a suitable manner and the tool is operated relative thereto by the amateur or semi-professional handyman. It is well established that either the workpiece or the tool in any machining operation must be held firmly and the other member guided accurately in order to provide a high quality and accurate finish to the product. Conventional work benches available to the amateur or semi-professional handyman do not provide this facility in a fully satisfactory manner.

It is now proposed, according to the present invention to provide a work bench comprising a rigid support, a main substantially flat topped working surface mounted on said support and having at least one pair of widely spaced apart lateral guide rods extending parallel to one another from at least one side of the working surface, and a clamping member slidably mounted on the or each pair of guide rods and lockable thereon in a variety of positions therealong to enable a tool to be clamped against the adjacent side of the working surface.

Such a structure can be very compact and is suitable for use in the home and yet enables the handyman to hold rigidly a tool.

Advantageously, a pair of parallel widely spaced apart laterally extending guide rods extend from each end of the working surface and each has a form of clamping member as referred to above. Thus, the workbench of the invention is preferably in three separate sections, a main section including the working surface, and a lateral section on each side providing the clamping facility. Advantageously these sections are of a totally different form.

In one preferred construction the clamping arrangement on one side may include a pair of laterally spaced bars which carry therebetween a substantially flat member, for example, a board, the upper surface of which is arranged slightly below the working surface of the central portion of the work bench. This may carry on its upper surface an angled member which can form the jaw or fence, the upper surface of the horizontal part of the angle member itself being flush with the working surface of the central portion. This can be used as a guide fence for moving a workpiece relative to a tool clamped by said clamping member. The bar nearer to the side of the working surface may itself be fixed, relative to the guide rods, and may form the fixed part of a screw operated vice which can assist in clamping a tool against the working surface. When the tool is so positioned a gap will exist between the end of the working surface and the adjacent clamping bar or vice part. This gap can be filled, in front of and behind the tool, by a suitable drop-in pillar board or the like which will assist in moving the work piece relative to the tool.

The clamping arrangement at the other end preferably takes a different form and can, for example, be in two parts extending perpendicular to one another. Thus it can include a first part which is substantially horizontal relative to the working surface and a second or skirt portion which extends essentially vertically at the end of the first part remote from the working surface. Both the first and second parts desirably have formed therein grooves of a dovetail or inverted top-hat section to accommodate T bolts. These T bolts in turn can clamp in place channel section holding members at any position longitudinally of the groove. Further T bolts in the channel section members can be used to fit a tool in place, these T bolts, it will be appreciated, being fully adjustable to marry up with apertures provided on the tool or a tool mounting plate.

The rigid support in a preferred form of workbench according to the invention comprises a central generally rectangular frame having extending longitudinally from each of its opposite ends the four guide rods forming the two pairs mentioned above. These guide rods are preferably circular in cross-section and have slidable therealong collar portions of legs so that one thus can have a four legged work bench. The legs themselves will advantageously be telescopic having co-operating bores in the telescopic parts to take pins to lock the legs at the desired height of the particular user. Fine adjustment may be provided by having threaded feet at the bottom of each leg to ensure that the table is stable on a particular floor surface. The legs themselves can be locked in pairs by suitable bracing members which are preferably removeable so that the legs can be folded up once a locking screw or the like on the collars has been released. Thus the whole work bench can be stored very compactly.

In order that the invention may more readily be understood, the following description is given, merely by way of example, reference being made to the accompanying drawings, in which:

FIG. 3a is a front elevation of the right hand portion of the work bench of FIG. 1;

FIG. 3b is a plan view of the portion of FIG. 3a;

FIG. 3c is a more detailed plan view of the right hand clamping member of FIGS. 3a and 3b;

FIG. 3d is an enlarged scrap view of the left hand portion of the clamping member of FIG. 3c;

FIG. 3e is a scrap end view of a portion of the clamping member shown in FIG. 3e and at the same scale as in that Figure;

FIG. 4a is an enlarged plan view of a portion of the working surface and the adjacent left hand clamping member;

FIGS. 4b and 4c are end views of the forward clamping bar and further cross piece respectively, as shown in FIG. 4a;

FIG. 4d is a front elevation of the left hand portion of the work bench of FIG. 1.

Figure 1:
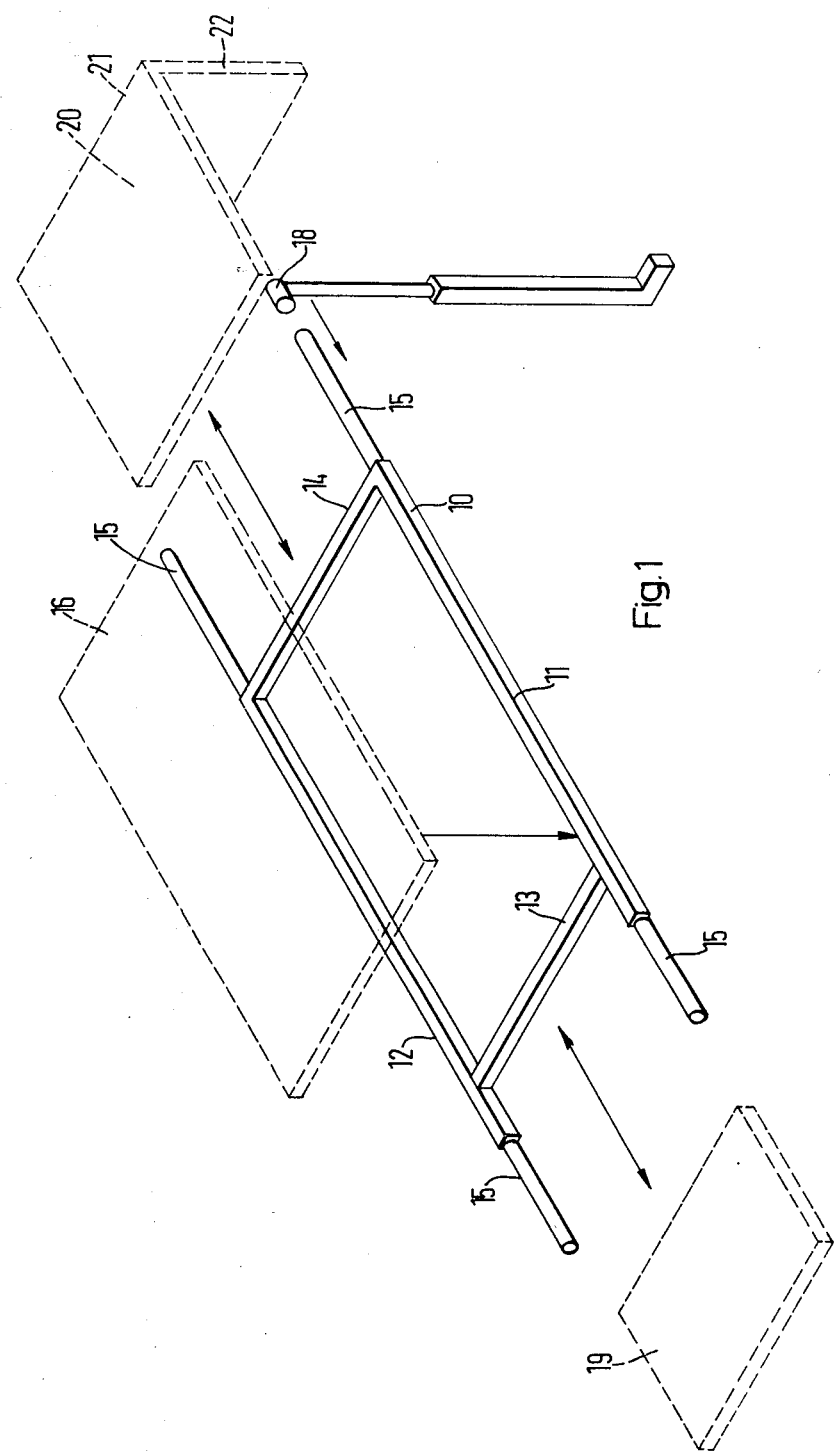
FIG. 1 is a schematic perspective view of one embodiment of work bench according to the invention.

Referring first to FIG. 1, the work bench illustrated therein includes a rigid frame 10 of generally rectangular form, including two parallel struts 11 and 12 and two transversely extending struts 13 and 14. Each of the struts 11 and 12 is extended at each end by a laterally projecting guide rod 15. The upper surface of the thus formed main frame has mountable thereon a working surface 16 which may, for example, be in the form of a board of chipboard or the like.

The main frame is supported on four legs 17 of telescopic nature, these each including, at the upper end, a collar 18 slidable on a respective one of the guide bars 15. The actual construction of these legs is illustrated in greater detail in FIG. 2 and will be referred to later. The collar could alternatively be hinged to the legs to allow these to be folded under the bench.

FIG. 1 also illustrates very schematically a left side clamping member 19 which is movable on the lefthand guide rods 15 in the manner indicated by the double-headed arrow lockable in one of a number of discrete positions therealong. The clamping element may also be moved by a screw connection. A righthand clamping member 20 is similarly movable and this includes a generally horizontally extending first part 21 and a second generally vertically extending skirt or second part 22.

Figure 2:
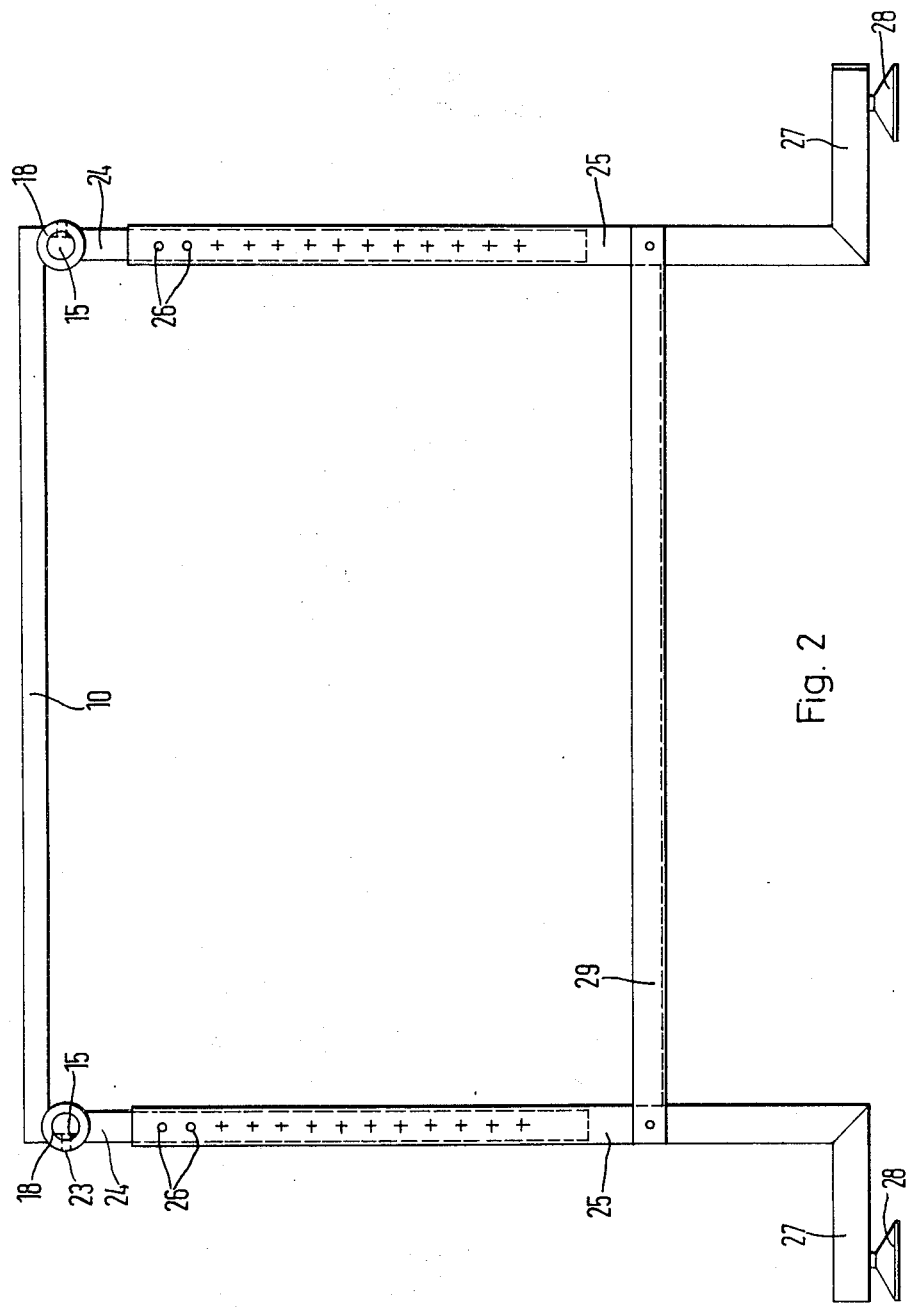
FIG. 2 is an enlarged view showing the arrangement of the legs of the workbench of FIG. 1.

Referring now to FIG. 2 the arrangement of legs is illustrated therein in greater detail. The guide bars 15 have, as indicated above, slidable therealong a collar 18 which is securable in place on a flat on the guide bar by means of a suitable clamping element such as a socket head screw 23. Welded to the lower part of each collar 18 is a sliding member 24 of the leg, this having telescopically fitted thereover a lower part 25. The parts 24 and 25 are each provided with a plurality of equally spaced bores 26 into which one can insert a pin or dowel to adjust the height of the frame 10. Adjacent legs of a pair are held together by a removable cross-strut 29.

At their lower end the lower parts 25 have outwardly extending feet portions 27 each having thereon an adjustable levelling foot 28 which may alternatively be a castor, the adjustment being such as to take into account any unevenness in the floor surface.

With the arrangement of hole 26 and their co-operating pins, the height of the table can be adjusted to suit a particular user.

Figure 3:
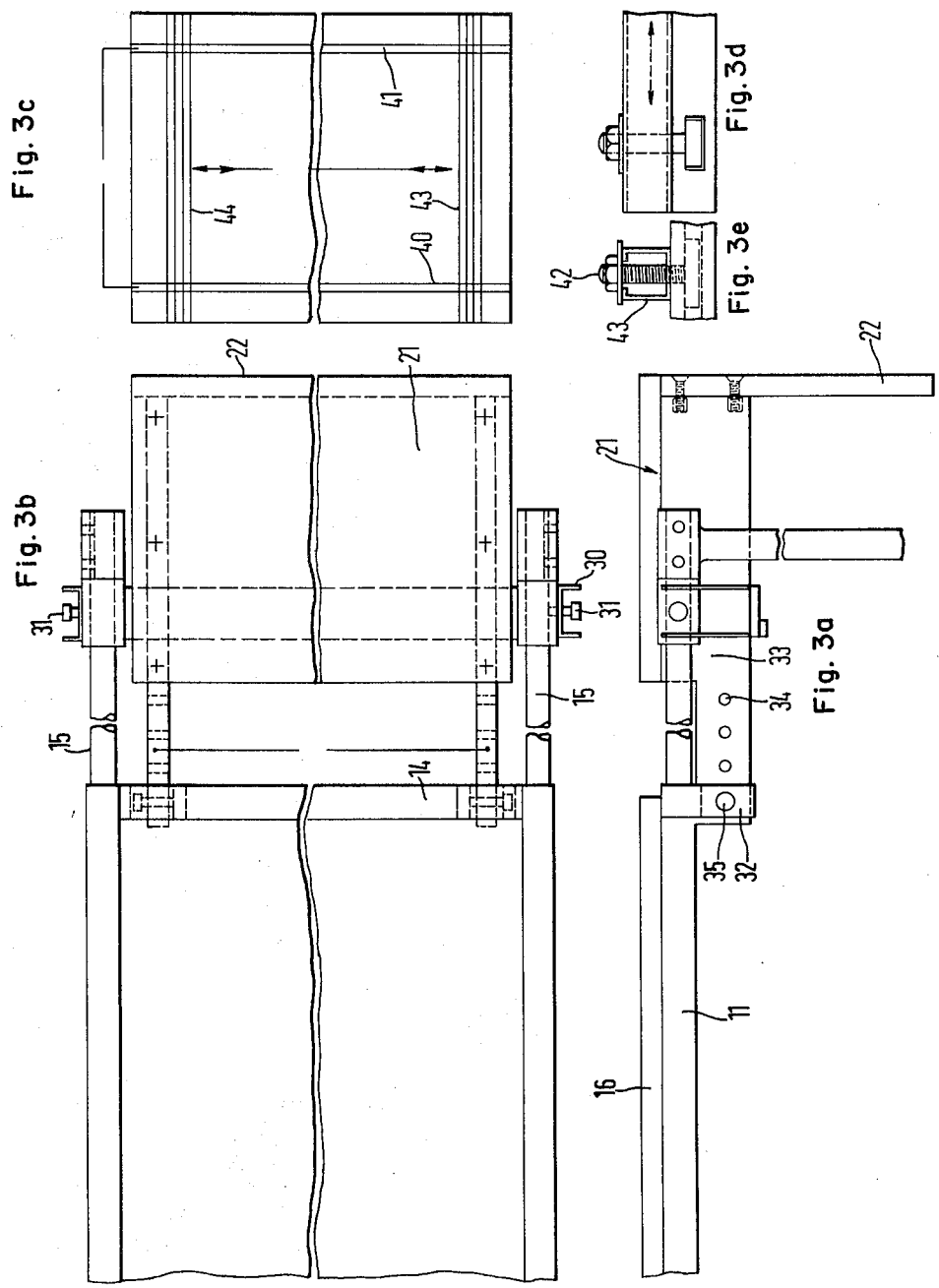

Referring to FIG. 3 the righthand arrangement of the table is illustrated and it can be seen that an adjustable bridge 30 is slidable along the two righthand guide rods 15 and can be secured in place by a bolt 31 on each guide rod. Mounted on the cross-member 14 are two U-shaped socket members 32 through which is slidable a runner 33 provided with a plurality of spaced bores 34 therein which can be located in alignment with further bores 35 in the U-shaped socket members 32 to position the righthand clamping member 20 in place.

The positioning is effected by means of dowels or other pins passed through the holes 34 and 35.

On its righthand side, as indicated previously the clamping member 21 has a downwardly or vertically extending skirt portion 22 both the skirt portion and the upper portion 21 have formed therein transversely extending T slots 40 and 41, the slots each carrying T bolts 42 which hold in place a pair of channel members 43 and 44 which can thus be spaced apart by any desired amount by loosening of the nuts associated with the T bolts 42 and moving them as desired. Further T bolts (not shown) are engaged in the channel members 43 and 44 and can be used to secure a tool or tool mounting plate in position on either the upper surface 21 or the skirt portion 22.

Figure 4:
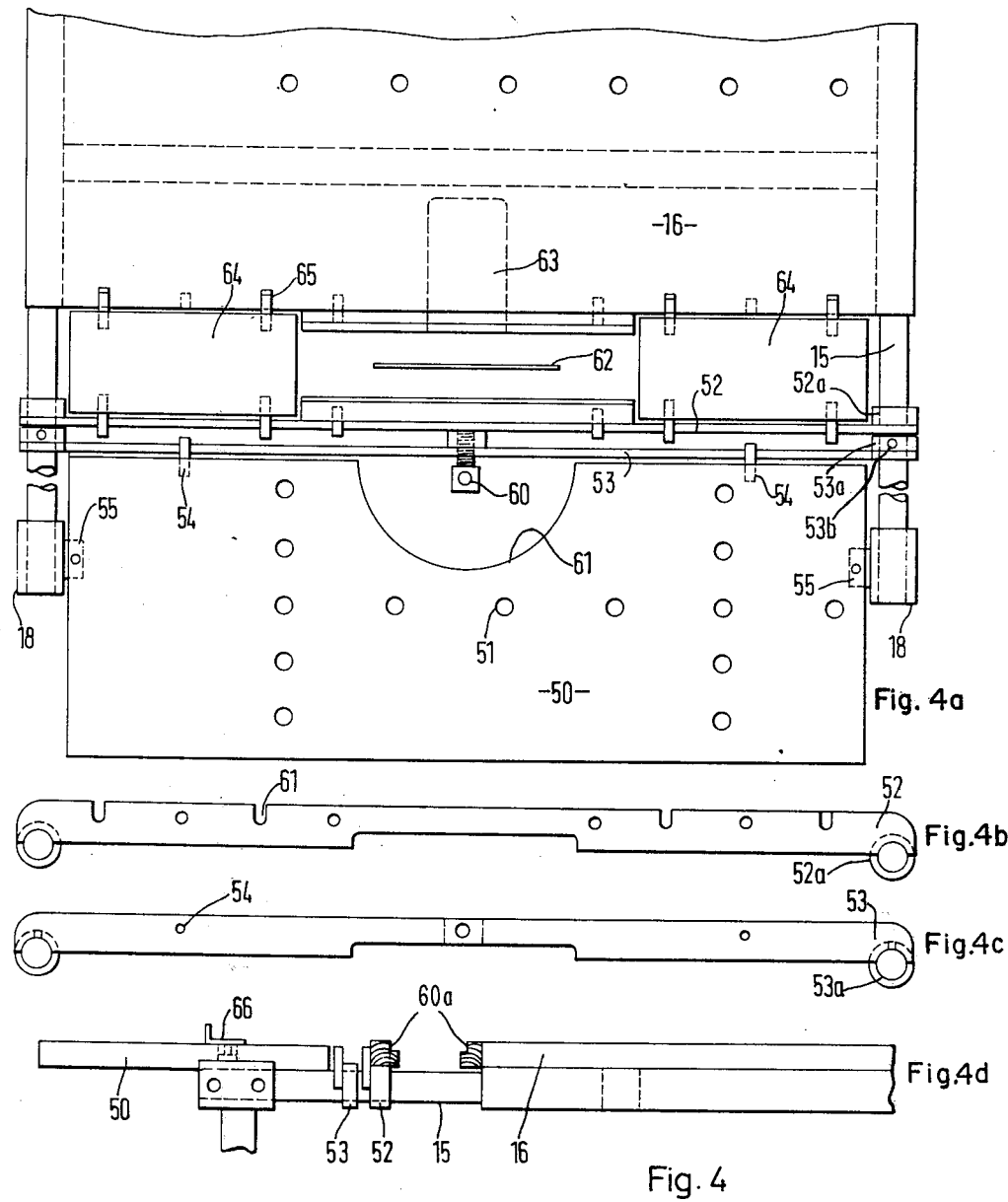

FIG. 4 illustrates the arrangement at the other end of the work bench. As can be seen the clamping member 19 is in the form of a board 50 which is provided with a plurality of vertically extending holes 51 to accommodate clamping members for a workpiece, if so desired. A forward clamping bar 52 has collars 52a slidable on the guide rod 15. Immediately outward of the clamping member 52 is a further crosspiece 53 again provided with collars 53a. Collar 53a also has a socket screw 53b for securing it in place on the respective guide rod 15. The board 50 is secured in place by means of dowels 54 engaging in the member 53 and by means of outwardly extending flanges 55 carried by the collars 18 of the adjacent legs.

To provide a further adjustment to the member 52, a vice screw 60 passes through a thread (not shown) in the member 53 and engages with the member 53 in a similar manner to a conventional work bench vice. This allows the member 52 to be moved slightly relative to the member 53, the handle of the vice 60 being accommodated in a recess 61 formed in the inner edge of the board 50.

Jaw members 60a are mounted on the clamping bar 52 at the side edge of the working surface 16 to receive the mounting plate of a device such as a circular saw which is shown in the plan view portion of FIG. 4. In this drawing in fact the saw is shown with its blade 62 and a recess is provided for the motor portion 63 in the board 16. In order to fill the gap between the clamping member and the edge or side of the working surface 16 filler pieces 64 are provided each having outwardly extending pegs 65 accommodated in appropriate recesses 66 in the member 52 and the edge of the working surface 16.

Once a tool such as a circular saw has been mounted in place the vice 60 is actuated to clamp it up tight and the filler pieces together with the working surface provide a suitable support for a work piece being sawn or otherwise machined.

In the lower portion of FIG. 4 there is illustrated an angle member 66 secured to the board 50 and extending transversely of the guide rods 15. This has an upper surface of its horizontal portion substantially flush with the upper surface of the working surface 16 and can be used as a guide fence to guide a work piece relative to the saw 62 or other tool. In the construction shown in FIG. 5, the working surface 16 has mounted thereon a work jig as described in greater detail in U.S. Pat. No. 4,126,118. This includes a guide fence 70 extending upwardly from the working surface 16 and defining a straight edge 71 which has a ruler 72 mounted therein-front. An adjustable stop 73 is mounted adjacent the fence and above the ruler 72. A bridge 74 is directly secured to the guide fence and is positioned to overlie a workpiece placed against the straight edge. A guideway 75 on the bridge extends accurately perpendicular to the straight edge. A slot in the bridge extends parallel to the guideway which is capable of guiding for movement therealong a router 77 accurately perpendicular to the straight edge 71, with the routing tool extending through the slot 76.

In use, a workpiece is placed on the working surface 16 against the straight edge 71 and is urged against the stop 73 which is adjusted to a position to give the length of the workpiece one wishes to finish up with. The router is then moved along the guideway so that it accurately machines the end of the workpiece perpendicular to the straight edge 71.

The work table is also provided with a further guide pusher 80 which can, advantageously, be spring-urged towards the guide fence 71. If one wishes to machine a straight edge on the workpiece parallel to the edge of the workpiece which is placed against the straight edge 71 of the fence 70, then this pusher is used to urge the workpiece against the fence 70 and the router is locked in the guideway at a position such that it will machine this edge when the workpiece is pushed parallel to the fence 70, that is upwardly as viewed in FIG. 5.

Figure 5:
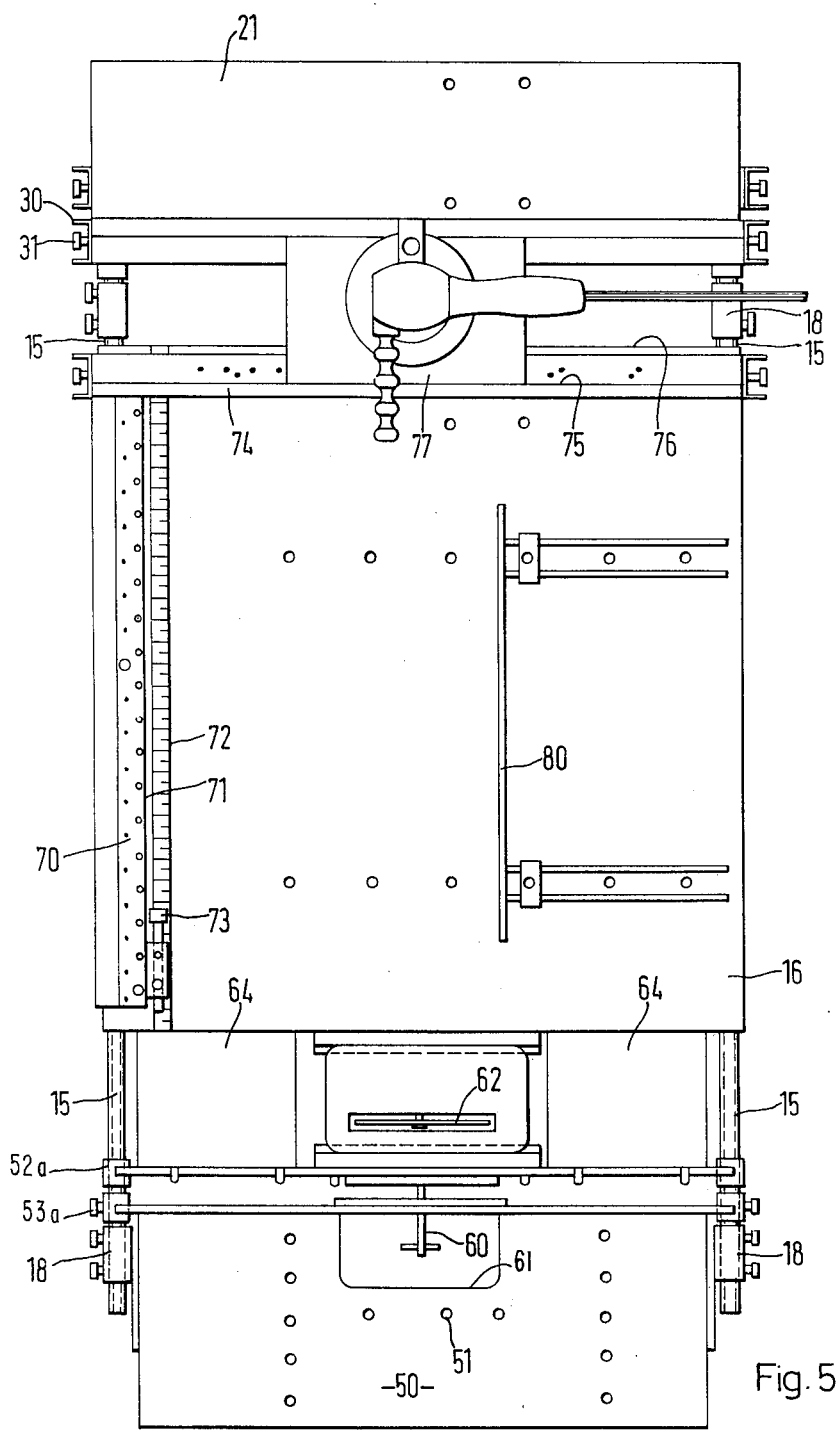
FIG. 5 is a more detailed plan view of the bench.

Advantageously a further spring-loaded pusher, which is not shown in the drawing, is mounted on the other side of the router on the member 21, which in this construction is formed as a simple flat board. This pusher member would then be operating on the cut workpiece and will therefore be slightly further to the left as seen in FIG. 5.

Instead of the router being mounted on the bridge, other tools could equally be mounted thereon. For example, one could mount a conventional drill stand so that one could drill holes at any desired position in the workpiece either by moving the drill stand along the guideway or by moving the workpiece along the straight edge.

I claim:

1. A work bench comprising, in combination:
(a) a rigid support;
(b) a main, substantially flat topped, working surface mounted on said support and having opposite ends;
(c) a pair of laterally space apart, longitudinal guide rods extending parallel to one another from each end of the working surface;
(d) a clamping member slidably mounted on said pair of guide rods for longitudinal movement therealong;
(e) means for locking said clamping member in a variety of positions therealong; and
(f) a screw operated device mounted on said clamping member and being operable to clamp a tool against the adjacent end of the working surface.

2. A bench as claimed in claim 1, wherein the clamping member on said at least one side includes a pair of longitudinally spaced cross pieces which carry therebetween a substantially flat member, the upper surface of which is arranged slightly below the upper surface of said working surface.

3. A bench as claimed in claim 2, wherein the upper surface of the flat member further comprises an angled member forming a jaw, the upper surface of the horizontal part of the angle member being flush with said main, substantially flat topped working surface.

4. A bench as claimed in claim 3, wherein the cross piece adjacent to the side of the working surface is itself fixed, relative to the guide rods, and forms the fixed part of said screw operated vice.

5. A bench as claimed in claim 1, wherein said rigid support comprises a central, generally rectangular, frame having extending longitudinally from each of its ends four of said guide rods which form two pairs of guide rods.

6. A bench as claimed in claim 2, wherein said clamping member at the other side comprises a first, horizontally extending part and a second part which extends vertically downwardly therefrom at the end of said first part remote from said working surface.

7. A bench as claimed in claim 1 and further comprising, on said working surface, a guide fence extending upwardly therefrom, the guide fence defining a straight edge, a bridge directly secured to the fence and positioned to overlie a work piece placed against said straight edge, a guideway on the bridge extending accurately perpendicular to the straight edge, a slot in the bridge extending parallel to said guideway.

8. A work bench as claimed in claim 7 and further comprising resiliently operable pusher means mounted on said working surface effective to urge a work piece against said fence while allowing the work piece to be moved parallel to the fence.

* * * * *